United States Patent [19]

Maeda

[11] Patent Number: 4,506,275
[45] Date of Patent: Mar. 19, 1985

[54] IMAGE SCANNING AND RECORDING DEVICE

[75] Inventor: Kiyoshi Maeda, Takatsuki, Japan

[73] Assignee: Dainippon Screen Manufacturing Co., Ltd., Kyoto, Japan

[21] Appl. No.: 395,436

[22] Filed: Jul. 6, 1982

[30] Foreign Application Priority Data

Jul. 13, 1981 [JP] Japan ................... 56-109830
Jul. 17, 1981 [JP] Japan ................... 56-112825
Jul. 18, 1981 [JP] Japan ................... 56-112563

[51] Int. Cl.³ .............................................. G01D 9/42
[52] U.S. Cl. ................................... 346/108; 358/302
[58] Field of Search ............... 346/108, 76; 350/96.25, 350/96.3; 358/302

[56] References Cited

U.S. PATENT DOCUMENTS

| | | | |
|---|---|---|---|
| 1,751,584 | 3/1930 | Hansell | 346/108 |
| 3,820,123 | 6/1974 | Ammann | 346/108 |
| 3,841,733 | 10/1974 | Ebersole | 346/108 |
| 3,982,253 | 9/1976 | Goshima et al. | 346/108 |
| 4,075,662 | 2/1978 | Gall | 358/302 X |
| 4,359,267 | 11/1982 | Appel | 350/96.25 X |

Primary Examiner—A. D. Pellinen
Assistant Examiner—Todd E. DeBoer
Attorney, Agent, or Firm—Millen & White

[57] ABSTRACT

An image scanning and recording device includes a recording unit for duplicating and recording halftone images on a photosensitive material. The recording unit comprises a light source associated with an acousto-optic light modulating element including a plurality of ultrasonic wave exciting portions disposed in an array side by side on a single acousto-optic medium. The ultrasonic wave exciting portions each independently modulate incident light into the respective modulated light beams in response to image signals from photoelectrical scanning means. In addition means are provided for directing light from the source to the acousto-optic light modulating elements. Also provided are means for forming rows of tiny light spots corresponding to the modulated light beams on a recording material.

5 Claims, 8 Drawing Figures

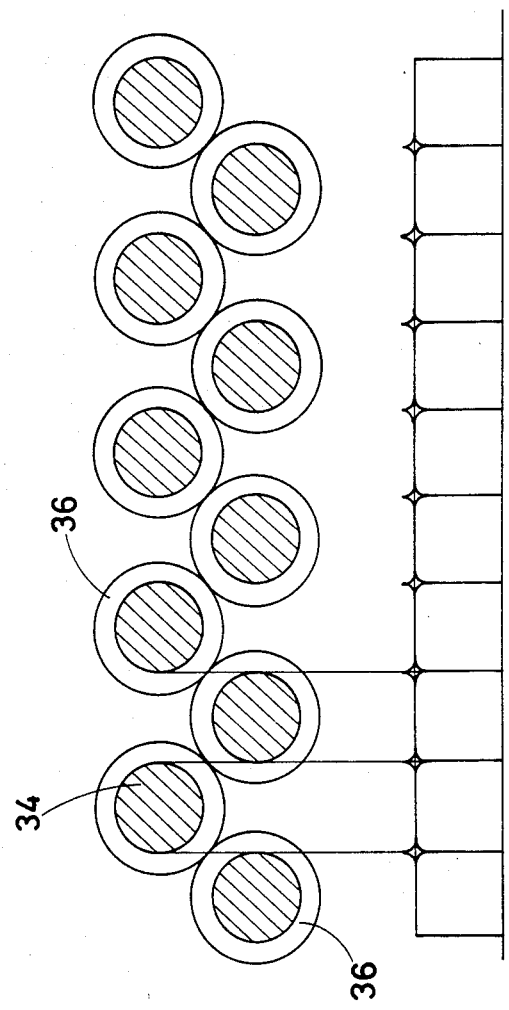

IMAGE SCANNING AND RECORDING DEVICE

TECHNICAL FIELD

The present invention relates to an image scanning and recording device for duplicating and recording halftone images on a photosensitive material by controlling exposure means on the recording side in response to image signals obtained by photoelectrically scanning an original.

BACKGROUND ART

Japanese Patent Publication No. 33523/1977 discloses a method of recording halftone images comprising the steps of splitting a light beam from a light source into a plurality of light beams by a combination of half mirrors and mirrors, and independently controlling the individual light beams in response to image signals from an original by an electro-optic light modulating element disposed correspondingly to the individual light beams. Japanese Patent Application Disclosure Nos. 118302/1977 and 12370/1977 disclose methods of recording halftone images comprising the steps of splitting a light beam from a light source into a plurality of light beams by a light beam splitter having parallel flat surfaces coated with a special film, and independently controlling, as in said Japanese Patent Application No. 33523/1977, the individual light beams in response to image signals from an original by an electro-optic light modulating element.

However, the electro-optic light modulating elements used in such conventional methods, when actually used, require a temperature control device since they are influenced by ambient temperature variations to a great extent, as described in said Japanese Patent Publication No. 33523/1977, thus having the drawback of increasing the size of the whole device. Further, to effect perfect modulation, i.e., ON-OFF control of the individual light beams, it is necessary to apply a bias voltage to the electro-optic modulating element, thus presenting drawbacks in regard to the circuit arrangement.

Furthermore, the light beam splitters used in these conventional methods each have their drawbacks. More particularly, with the light beam splitter disclosed in Japanese Patent Publication No. 33523/1975, which is constituted of a combination of half mirrors and mirrors, light beam splitting is effected by the light beam passing successively through the half mirrors, thus having a drawback that the light beams become nonuniform in intensity. On the other hand, the light beam splitter used in Japanese Patent Application Disclosure No. 118302/1977 must be increased in size as the number of light beams into which the light beam is split is increased, and as the splitter is increased in size, the parallelism between the light beam receiving and emitting surfaces becomes more difficult to attain, causing the further drawback of increasing the cost of production.

As will be described in greater detail hereinafter, the present invention provides an image scanning and recording device which eliminates these disadvantages.

SUMMARY OF THE INVENTION

According to the present invention there is provided an image scanning and recording device including a recording unit for duplicating and recording halftone images on a photosensitive material.

According to the present invention, the recording unit comprises a light source; an acousto-optic light modulating element including a plurality of ultrasonic wave exciting portions disposed in an array side by side on a single acousto-optic medium, and said ultrasonic wave exciting portions each independently modulating incident light into the respective modulated light beams in response to image signals from photoelectrically scanning means. Means are provided for directing light from the source to the acousto-optic light modulating element. Also included are means for forming rows of tiny light spots corresponding to said modulated light beams on a recording material.

According to the present invention, the light directing means preferably includes a light beam flattener which flattens the light beam from the light source and distributes the flattened beam along the array of the plurality of ultrasonic wave exciting portions. Alternatively, the light directing means comprises a beam distributor for splitting a light beam from the light source into a plurality of beams which inpinge on the plurality of ultrasonic wave exciting portions.

Further, according to the present invention, the means for forming rows of tiny tight spots includes a focussing lens system which receives the modulated light beams from the acousto-optic element and causes the recording material to be exposed to the rows of tiny light spots. Meand are provided for individually transferring the modulated light beams to the focussing lens system.

BRIEF DESCRIPTION OF THE DRAWINGS

FIG. 8 is a similar view to FIG. 7 showing another form of the array of optical fiber bundles.

DESCRIPTION OF THE PREFERRED EMBODIMENT

Figure 1:
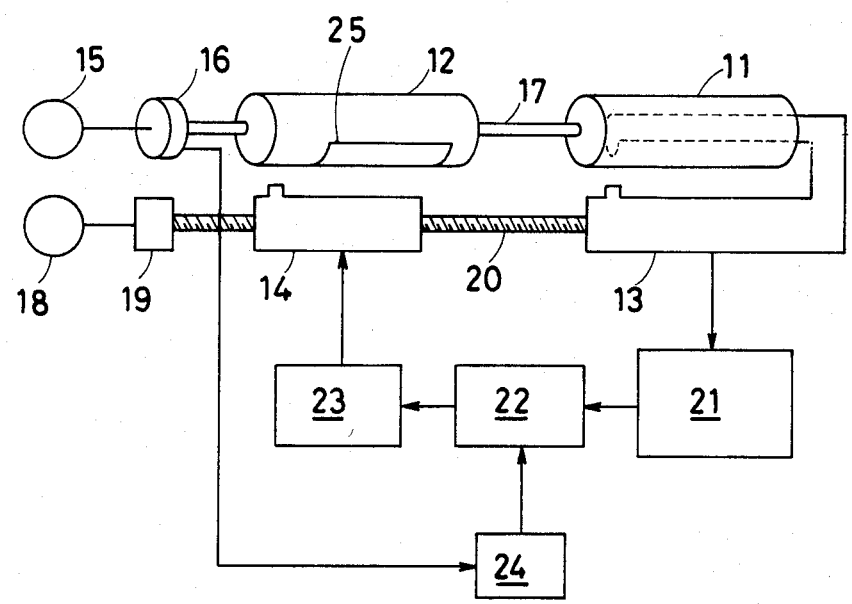
FIG. 1 is a schematic illustration of an image scanning and recording system used in the present invention.

Referring now to the drawings, there is illustrated in FIG. 1 an image scanning and recording system. The system has an original cylinder 11 and a recording cylinder 12 carrying a recording material 25 both concentrically connected to a common shaft 17 for synchrous rotation. At the same time as an original cylinder 11 connected to the shaft 17 of a recording cylinder 12 is rotated at a suitable speed together with the recording cylinder 12, a feed screw 20 is rotated by a motor 18 through a speed reducer 19, so that the recording head 14 and a scanning head 13 are moved at a suitable speed axially with respect to the cylinders, and the scanning head 13 photoelectrically scans an original mounted on the original cylinder 11, thereby providing image signals. The image signals are processed in a color arithmetic circuit 21 for color compensation and gradation compensation, as in the usual color scanner, for duplicating and recording purposes to provide a proper print, and with the compensated image signals being then transferred to a dot forming circuit 22. The dot forming circuit 22 generates halftone forming signals in response to the image signals and to pulse signals which are produced in a pulse generator 24 in response to signals from a rotary encoder 16. The halftone forming signals are transferred to the recording head 14 though a drive circuit 23, controlling the individual light beams emitted from the recording head 14, whereby halftone images are recorded on a film 25 on the recording cylinder 12. In addition, the arrangement of the color scanner shown in FIG. 1 has been considerably simplified for convenience of description, but the device according to the present invention is not limited in application to such arrangement.

Figure 2:
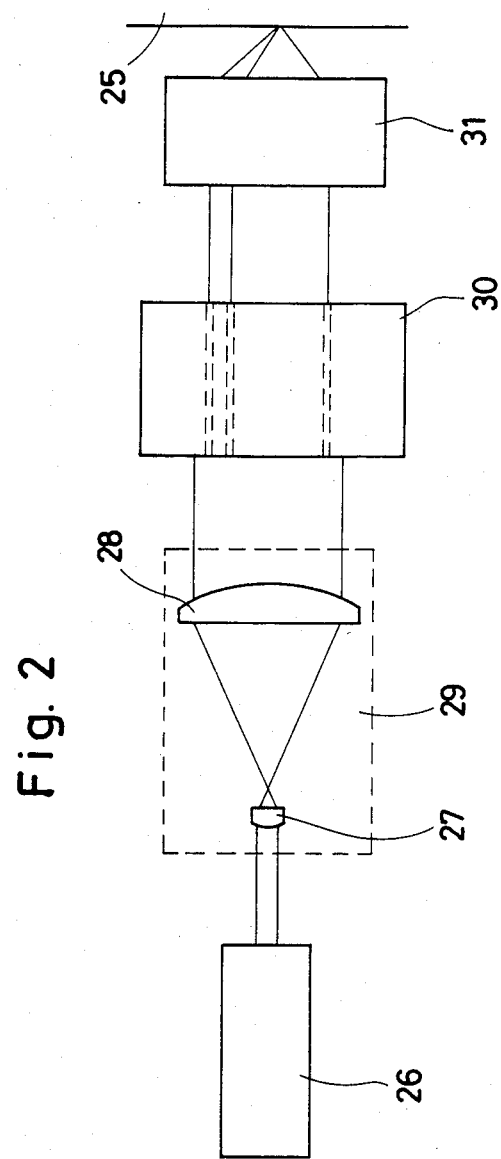
FIG. 2 is a block diagram of the recording unit of the image scanning and recording system according to one embodiment of the present invention.

FIG. 2 shows the recording unit of an image scanning and recording device according to an embodiment of the invention, wherein 26 denotes a light source such as a laser; 29 denotes light directing means which in this case include a light beam flattener made up of a pair of cylindrical lenses 27 and 28. An acousto-optic light modulating element including a plurality of ultrasonic wave exciting portions arranged in an array side by side on a single acousto-optic medium. A focussing lens system 31 is also provided for projecting in a predetermined scale-down ratio the incident light beams from the acousto-optic light modulating element 30 onto a film 25 on the recording cylinder 12.

Such an image recording unit is contained in the recording head 14 in FIG. 1, thus, the halftone forming signals produced in the dot forming circuit 22 are imposed on the respective ultrasonic wave exciting portions of the acousto-optic light modulating element 30 through the drive circuit 23, and the portions of incident light beam impinging on the respective ultrasonic wave exciting portions are independently ON-OFF controlled in response to the image signals from the scanning side.

Therefore, the light beam of substantially circular cross-section from the light source 26 falls upon the light beam flattener 29 made up of a pair of cylindrical lenses 27 and 28 so arranged as to have a common focal axis and a common focal point, and is converted into a flat form of light beams adapted for the light beam receiving surface of the subsequent acousto-optic light modulating element 30, whereupon the flat light beams fall upon the light modulating element 30. Of the flat light beams which fall upon the light modulating element 30, those which fall upon the portions on the acousto-optic medium corresponding to the individual ultrasonic wave exciting portions are modulated by ultrasonic signals from the individual ultrasonic wave exciting portions and in accordance with halftone forming signals produced in the dot forming circuit 22 in FIG. 1, the modulated light beams, in plural numbers, are emitted as 1st and 0th order light. On the other hand, the light beams falling upon the portions on the acousto-optic medium not corresponding to the individual ultrasonic wave exciting portions just pass through said acousto-optic medium. Thus, only the 1st order light in the form of a plurality of light beams modulated in response to the dot forming signals is projected in a predetermined scale-down ratio on a film 25 on the recording cylinder 12 by the subsequent focussing lens system 31 to form rows of tiny light spots, thereby duplicating and recording halftone images.

Since rows of light spots are formed by employing a light beam distributor and an acousto-optic light modulating element including a plurality of ultrasonic wave exciting portions arranged side by side on an acousto-optic medium, it is possible to provide a small-sized, inexpensive halftone image scanning and recording device. Further, such an acousto-optic light modulating element, unlike an electro-optic light modulating element, does not require temperature control and saves the need for a deflecting plate, thus providing for simple control and small size.

As another embodiment of the light beam flattener 29, a concave cylindrical lens may be used as one of the cylindrical lenses 27 and 28 in the pair.

Figure 3:
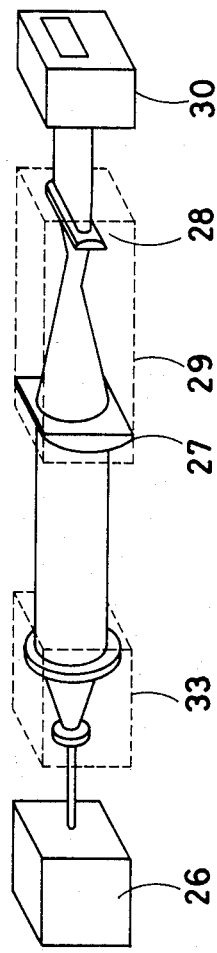
FIG. 3 is a perspective view of the recording unit of the present invention having a beam flattener.

Still another embodiment of the light beam flattener is shown in FIG. 3. This embodiment has a beam expander 32 between the light source 26 and the beam flattener 29. This embodiment is useful particularly where the light source 26 and the acousto-optic light modulating element 30 are separately positioned. The above described embodiments have the following advantages.

(1) The use of the light beam flattener enables splitting and modulation to be effected by the light modulating element without having to use a light beam splitter. Moreover, the light beam flattener has simpler components than a conventional light beam distributor, thus providing for reduction of the size and cost of the device.

(2) Where laser beams are used, the parallelism of light beams, which is usually some m rad, is some m rad/$\alpha$ where $\alpha$ is the magnification factor, so that the light modulating element and the light beam flattener can be spaced from each other, thus allowing an engineering design to contain only the light modulating element in the recording head 14, contributing to reduction of the size and weight of the recording head 14, which adds to convenience.

(3) As compared with an arrangement wherein the acousto-optic light modulating element is preceded by a light beam splitter, the present arrangement does not require special accuracy in locating light beam emitting and receiving positions between the light modulating element and the light beam flattener, so that rather, the rate of utilization of light beams can be increased.

Figure 4:
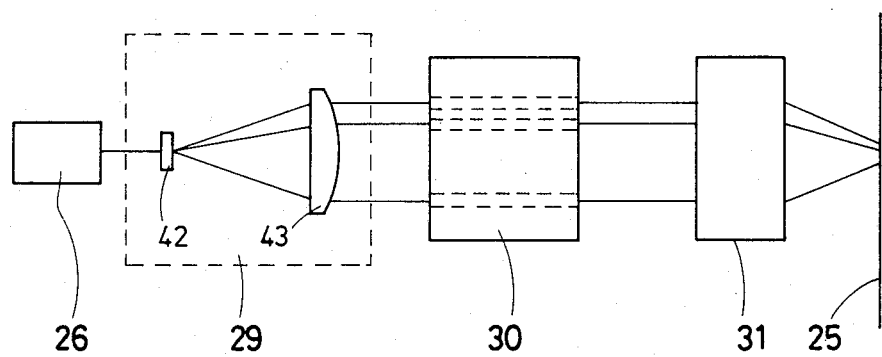
FIG. 4 is a view similar to FIG. 2 illustrating a beam distributor according to another embodiment of the invention.

Another embodiment of the light directing means to the acousto-optic light modulating element 30 is shown in FIG. 4. The device of this embodiment includes a light distributor 29 consisting of a diffraction grating 42 for splitting the light beam from the light source 26 into a plurality of light beams by the action of diffraction and a convex lens 43 positioned so that its distance from said diffraction grating 42 corresponds to its focal length.

Therefore, the light beam from the light source 26 is first splitted into a plurality of light beams by the diffraction grating 42 and then changed to parallel light beams by the convex lens 43, the plurality of said parallel light beams falling upon the light modulating element 30 in the same manner as the previous embodiments.

The use of a diffraction grating as a light beam distributor results in a flat, small-sized, lightweight light beam distributor, which is convenient for making the device small in size. If the focal length of the convex lens combined with the diffraction grating is changed, the pitch of parallel light beams can be easily changed.

Figure 5:
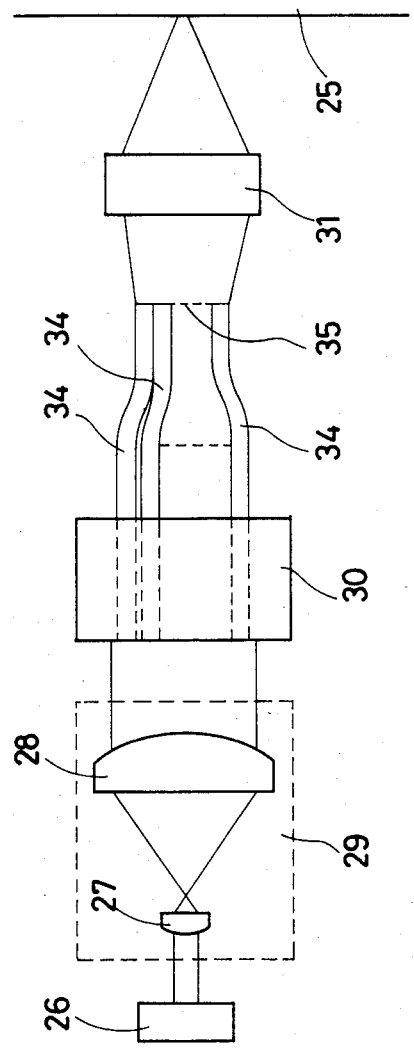
FIG. 5 is a view similar to FIG. 2 illustrating means for transferring light beams from an acousto-optical light modulating element of a focussing lens system.
Figure 6:
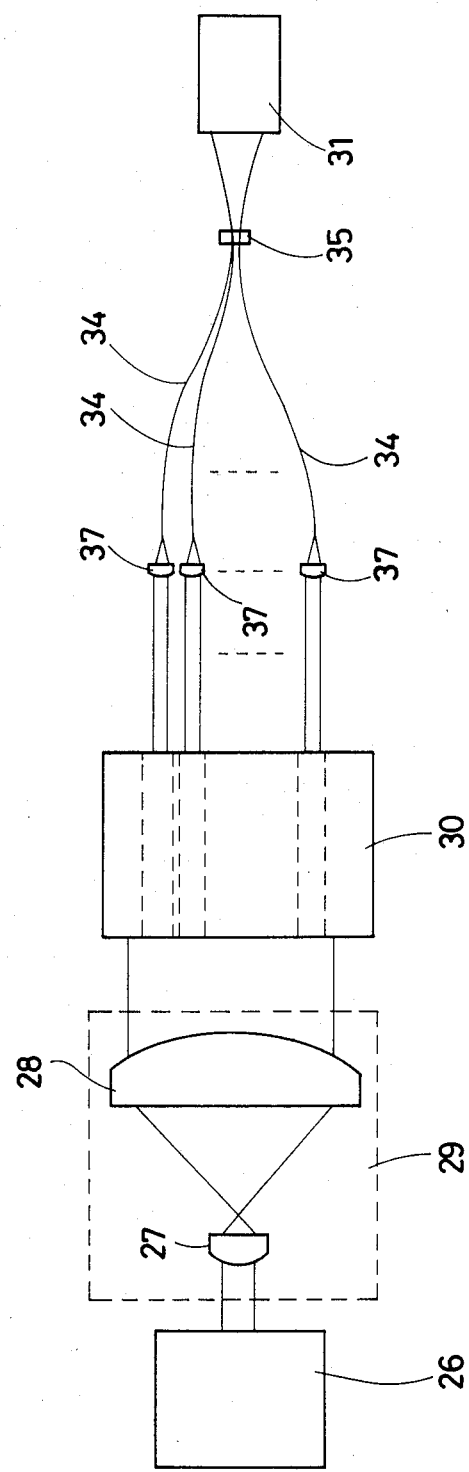
FIG. 6 is a view similar to FIG. 5 illustrating the light transfer means according to a further embodiment of the present invention.

The device of the present invention preferably comprises as shown in FIGS. 5 and 6 means for transferring the modulated light beams from the acousto-optic light modulating element 30 to the focussing lens system 31.

The FIG. 5 embodiment includes a plurality of flexible light transfer means 34 such as optical fiber bundles associated with the plurality of ultrasonic wave exciting portions of the light modulating element 30 for individually transferring the modulated light beams to the focussing lens system 31.

Figure 7:
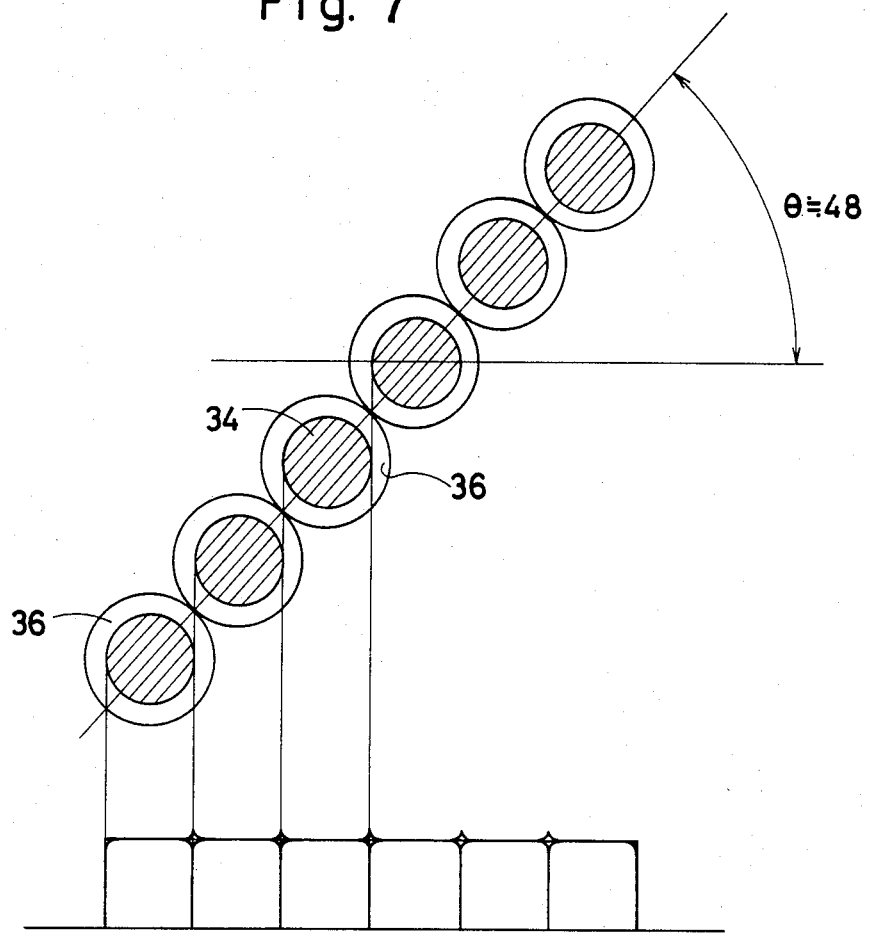
FIG. 7 is an enlarged cross-sectional view of the output ends of one form of the array of optical fiber bundles used in the embodiments of FIGS. 5 and 6.

The FIG. 6 embodiment differs from the FIG. 5 embodiment in that when the light beams from said light modulating element 30 are introduced into the individual light transfer means 34, they are introduced thereinto by a scale-down optical system consisting, e.g., of a plurality of tiny lenses 37 corresponding in number to the individual light beam transfer means 32. The use of such scale-down optical system preceding the individual light beam transfer means 34, as in this embodiment, makes it possible to reduce the diameter of the light beam transfer means 34 transferring the light beams from the light modulating element 30 and to provide for size reduction; thus, this arrangement is practical.

Where the output ends 35 of the light beam transfer means 34 are arranged in a row in these embodiments, they are arranged obliquely upwards, i.e., somewhat shifted in the subcoordinate scanning direction as shown in FIG. 7, to ensure that the distribution of light quantity in a row of tiny light spots to be printed is constant, and where they are arranged in two steps, they are arranged adjacent each other in a zigzag fashion, as shown in FIG. 8 thereby making constant the distribution of light quantity. As can be seen in FIGS. 7 and 8, this is intended to prevent the influence of clads 36, which cover the optical fibers constituting the light beam transfer means 34, from extending to the distribution of light quantity.

The embodiment shown in FIG. 5 or 6 can afford a number of important advantages.

Since the light source and the focusing lens system can be separated, the member for housing the focusing lens system, such as the recording optical system, can be reduced in size and, moreover, the relative positions of the light source and focusing lens system can be optically determined.

The use of a plurality of light beam transfer means which are flexible allows the output ends thereof to be disposed adjacent each other, making it possible to optionally determine the arrangement of images of light spots.

If the flexible light beam transfer means are in the form of optical fibers, the linear light beam row arrangement can be changed to zigzag light beam row arrangement and the focusing lens system can be rotated. Further, since they are optical fibers, it is possible to prevent disturbance of light beams due to air flow and dust in the air.

Since the output ends of optical fibers can be freely brought close to each other, the distribution of light quantity can be made uniform.

Although the invention is described by making reference to specific preferred embodiments thereof, those skilled in the art can make various modifications and substitutions thereto without departing the true spirit of the present invention. For example, it is possible to use in place of a beam flattener as shown in FIGS. 2 and 3, or a beam distributor as shown in FIG. 4 a combination of half mirrors and mirrors, or a beam splitter constituted of parallel flat plates such as the one disclosed in Japanese Patent Application Disclosure No. 118302/1977 or 123701/1977.

The above has been referred to for illustrative purposes only, and it is not for the purpose of limiting the scope of this invention which is defined in the claims below.

I claim:

1. An image scanning and recording device including a recording unit for duplicating and recording halftone images on a photosensitive material, said recording unit comprising:

light source means for providing a beam of light;

acousto-optic light modulating means for modulating light from said light source means, said acousto-optic light modulating means comprising a plurality of ultrasonic wave exciting portions disposed side by side in an array on a single acousto-optic medium, and said ultrasonic wave exciting portions each adapted for independently modulating incident light into respective modulated light beams in response to image signals from a photoelectrical scanning means of said device;

directing means for directing light from said source to said acousto-optic light modulating means, said directing means comprising a light flattener which comprises a pair of cylindrical lenses so arranged to have a common focal axis and a common focal point for flattening the light beam from the source and distributing the flattened beam along the array of the plurality of ultrasonic wave exciting portions;

light spot row forming means for forming rows of tiny light spots produced by said modulated light beams on a recording material, said light spot row forming means comprising a focussing lens system for receiving the modulated light beams from the acousto-optic modulating means and for causing the recording material to be exposed to the rows of tiny light spots, whereby the rows of tiny light spots are formed by projecting the plurality of modulated light beams in a predetermined scale down ratio onto the recording material; and transfer means for individually transferring the modulated light beams from the acousto-optic light modulating means to the focussing lens system, said transfer means comprising a plurality of optical fiber bundles with each optical fiber including a clad covering the respective fibers making up said transfer means, and said fibers arranged in a configuration for preventing said clads from extending the distribution of light quantity.

2. The device as in claim 1, wherein a beam expander is positioned between the light source means and the beam flattener.

3. The device as in claim 1 further comprising a plurality of tiny lenses for individually introducing the modulated light beams into the light transfer means in a predetermined reduced scale.

4. The device as in claim 1 wherein said plurality of optical fiber bundles are arranged obliquely upwards to be shifted in the subcoordinate scanning direction to ensure that the distribution of light quantity in a row of tiny light spots to be printed is constant.

5. The device as in claim 1 wherein said plurality of optical fiber bundles are arranged adjacent each other in a zigzag manner.

* * * * *